Figure 1:
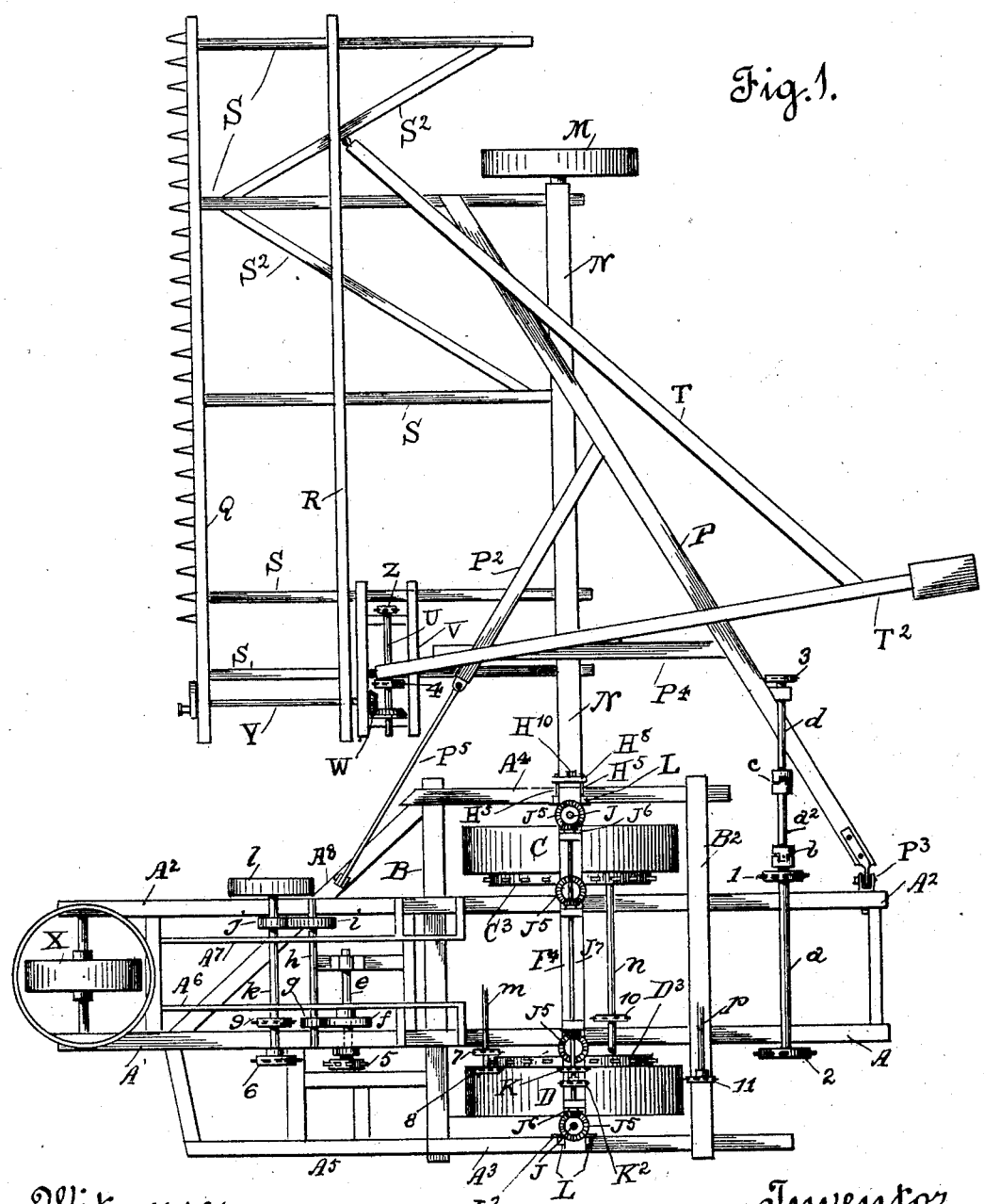

No. 711,157. Patented Oct. 14, 1902.
G. W. HAINES.
HARVESTER.
(Application filed Dec. 29, 1898.)
(No Model.) 4 Sheets—Sheet 1.

Witnesses. Inventor.
Geo. W. Haines
by A. H. Ste Marie
att'y

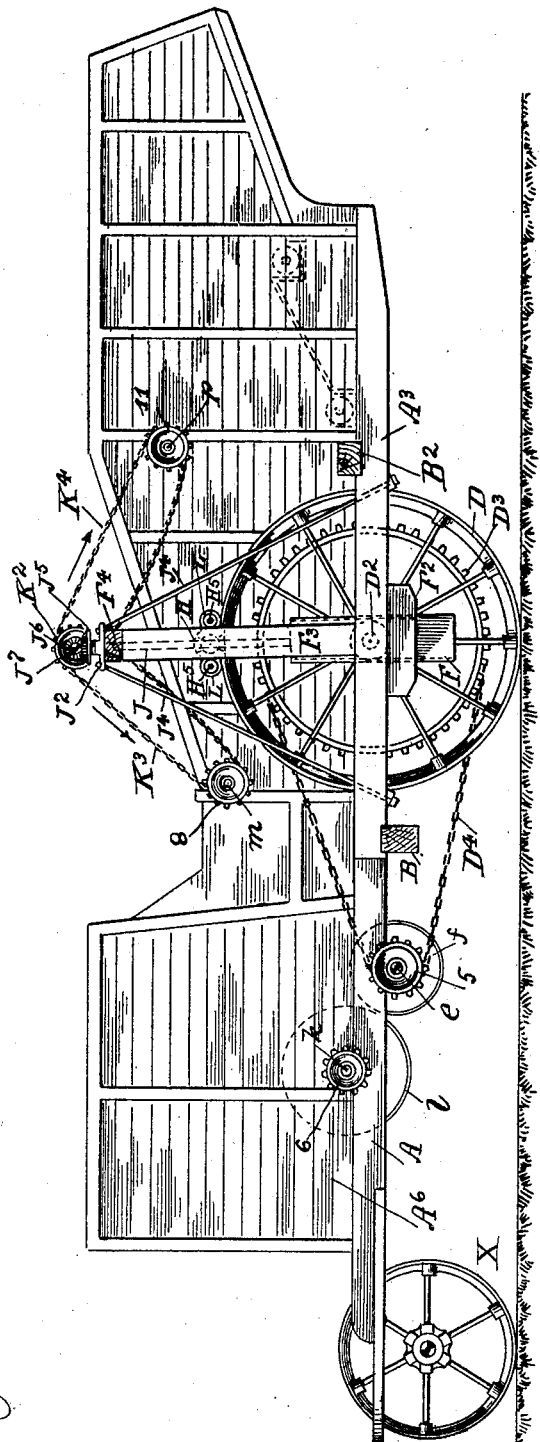

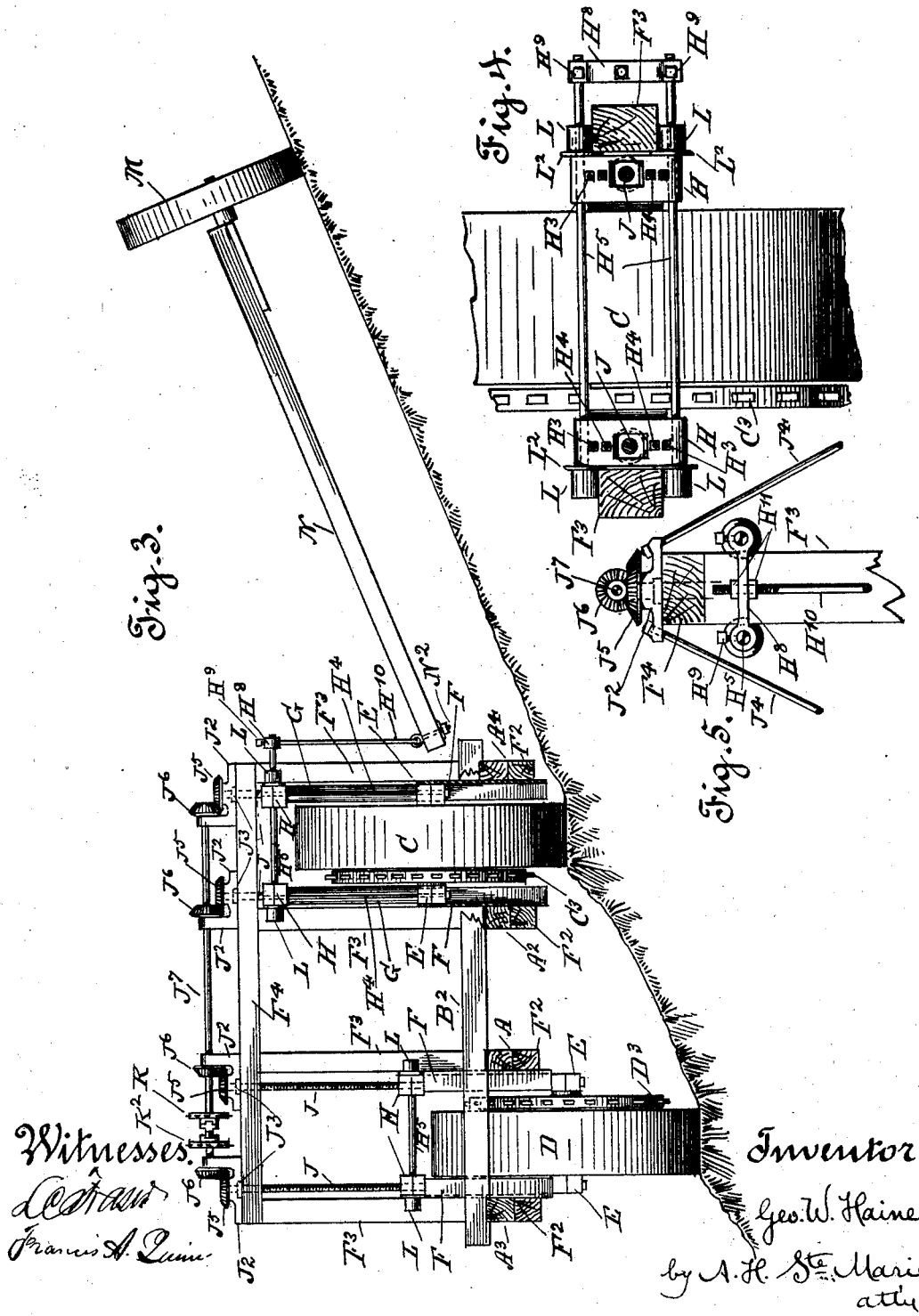

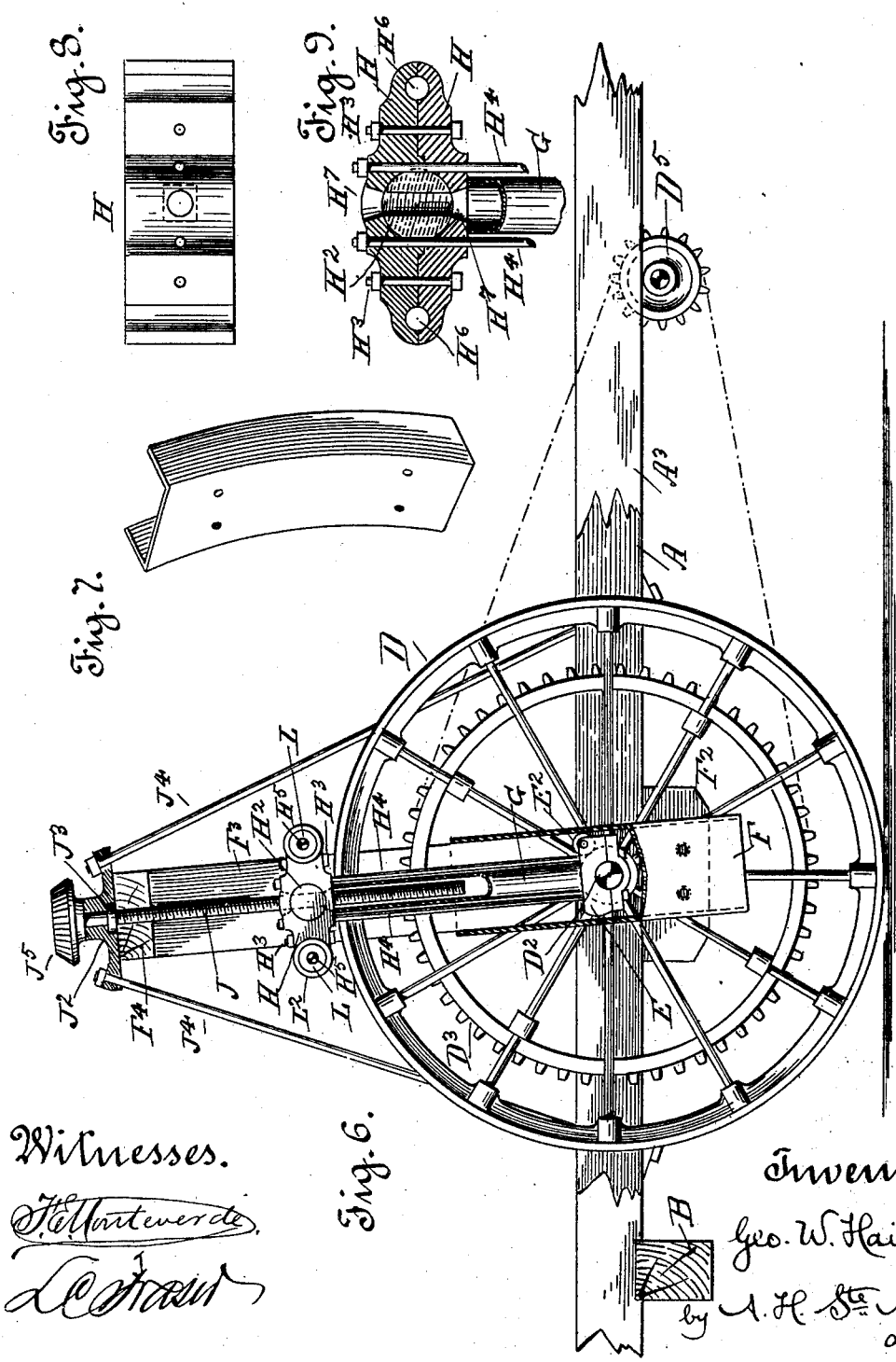

UNITED STATES PATENT OFFICE.

GEORGE W. HAINES, OF STOCKTON, CALIFORNIA, ASSIGNOR TO THE HOUSER AND HAINES MANUFACTURING COMPANY, OF STOCKTON, CALIFORNIA, A CORPORATION OF CALIFORNIA.

HARVESTER.

SPECIFICATION forming part of Letters Patent No. 711,157, dated October 14, 1902.

Application filed December 29, 1898. Serial No. 700,644. (No model.)

*To all whom it may concern:*

Be it known that I, GEORGE W. HAINES, a citizen of the United States of America, and a resident of Stockton, in the county of San Joaquin and State of California, have invented certain new and useful Improvements in Harvesters, of which the following is a specification.

The purpose of my invention is to improve what are commonly known as "two-wheel sidehill-harvesters." Harvesters of this class consist of a header and thresher combined and are built in such a manner that as the machine goes around a hill one of the driving-wheels (which are placed in the thresher-frame) may be raised and the other lowered, according to the incline of the ground, to keep the bed of the thresher part of the machine level. The header part of the harvester is supported at the outer end by a single wheel, called the "grain-wheel," and at the inner end is hinged to the thresher part, so as to allow the header-knife to move parallel with the surface of the ground to be cut over. The thresher is mounted on three wheels—two rear wheels, which carry the most of the weight and are the driving-wheels for the whole mechanism, and a front wheel, that balances the machine and is the means by which it is steered. Most machines of this class which have been built before have proved to be unsatisfactory, because there is not enough stiffness and rigidity to the apparatus by which the driving-wheels are raised and lowered. They cannot be adjusted to stay at the precise position desired, and on account of the clumsiness of the machinery they are subject to frequent breakdowns. Most of the machines previously made have each of their two driving-wheels set in a separate frame, and each of these frames is hinged at the rear to the timbers composing the main frame of the thresher. The wheel-frames thus hinged, with the driving-wheels in them, are raised and lowered in opposite directions, each by means of two chains fastened to brackets on their forward corners and coiled around drums that are fixed upon a shaft which is rotated either way by a worm and wheel. The two chains connected with the corners of the same frame seldom wind or unwind evenly, one being likely to twist and become shorter than the other, the result being the frame fails to work properly, if it does not break down altogether. Another method that has been suggested was to have the axles of the two main wheels supported by means of fixed pinions meshing in vertical racks. In this latter arrangement the wheels were to be moved up and down by sprocket-wheel-and-chain devices; but the machine could not be of any practical use, because the chains would not hold the axles firmly in the exact position desired and would allow too much wabbling and play to the machinery. Finding the art in this condition, I have invented a method for raising either one of the driving-wheels, as desired, and at the same time lowering the other one by means of long screws so connected with the axles of the driving-wheels that I can adjust said wheels at any desired height and hold them there. There is no chance for the least possible wabble to my machine. It is stanch, perfectly adjustable, and in every sense practical.

In the accompanying drawings, which are hereby specially referred to, Figure 1 is a plan view of the framework of the entire machine, showing the mechanism for raising and lowering the two main wheels of the thresher and the driving-gears for both the thresher and the header. Fig. 2 is a side elevation of the thresher. Fig. 3 is a rear elevation of the machine, showing the main rear timber of the thresher-frame partly broken and the main timber only of the header-frame. Fig. 4 is a detail showing on an enlarged scale a section of the right-hand driving-wheel and parts connected therewith. Fig. 5 is a detailed view of the top of the right-hand post of the threshing-machine to which the main timber of the header is connected. Fig. 6 is an enlarged view of the left driving-wheel and the mechanism to work it; but the wheel in this view is geared back to illustrate that the machine will work as well that way as when the wheel is geared forward, and in that sense this construction is a modification of the mechanism shown in Fig. 2. Fig. 7 is a modification showing a curved guide for the axle-boxes of the driving-wheels. The guides shown in Figs. 2 and 6 are straight. Fig. 8 is a plan view of the lower half of a box that is shown in section in Fig. 9. Fig. 9 is a sectional view of the box just referred to. There are four of these boxes, each adapted to hold a cylindrical nut through which passes one of the screws that are used for raising and lowering the driving-wheels and each resting on the upper end of a pipe in which the screw works.

Similar letters of reference indicate corresponding parts in all the figures.

The main frame of the thresher part of my harvester is composed of two main longitudinal timbers A and $A^2$ and two cross-timbers B and $B^2$. There are also two shorter longitudinal timbers $A^3$ $A^4$, one outside of each driving-wheel and fastened to said cross-timbers. The separator is built on the two long timbers A $A^2$, and the cross-timbers B $B^2$ bind the others in place and stiffen the machine. The steering-wheel X is placed in the front part of the frame between the ends of the longitudinal timbers A $A^2$. On the left side of the frame, directly in front of the left driving-wheel, is a small frame $A^5$ for the sack-sewer's platform. The timbers of this latter frame are bolted to the under side of the timbers of the main frame of the thresher. There are two boards $A^6$ and $A^7$ set on edge and placed between the front parts of the two main timbers A $A^2$ for the purpose of narrowing the space between said timbers equal to the length of the threshing-cylinder. These two boards are so placed with reference to each other that they form the base for the walls of the feeder-house and cylinder inclosure. The cleaner part of the thresher (not shown in the drawings) will rest partly upon the front cross-timber B and partly upon the separator over the left driving-wheel.

Both the right-hand driving-wheel C and the left driving-wheel D are hung on and keyed to separate steel axles, such as $D^2$. These axles are short and only pass through the wheel and through two axle-boxes, one on each side of said driving-wheels. Only one of these axle-boxes is shown in detail in the drawings, and that in Fig. 6; but as they are all of the same construction I shall designate them all by the reference-letter E. These boxes E are each cast in two pieces, (upper and lower,) which pieces are bolted together in such a manner as to allow the axles $D^2$ to freely revolve within said boxes. It will thus be seen that there are two driving-wheels C and D. Each wheel has a separate axle $D^2$, and each axle works in two axle-boxes E, (one on each side of the driving-wheel.) Each of said axle-boxes is constructed to work up and down in a separate metal guide F, and except for said perpendicular movement said boxes are held quite firm. For the purpose of facilitating said movement of the boxes E in said guides each box is provided with an antifriction-roller $E^2$. These rollers $E^2$ are fastened in the upper part of the axle-boxes E in such a manner that they bear upon the rear side of the guide F, for the traction-power transmitted through the frame of the thresher is applied to the wheels C and D through said rear side of guide F.

Each of the guides F consists of a long metal box having three sides and an opening toward the driving-wheel instead of a fourth side. In Fig. 7 is shown a modified form of guide in which the front and rear sides of the guide are bowed, as there shown. The bottoms of said guides F are bolted to blocks $F^2$, which blocks are bolted to the under sides of the longitudinal timbers A $A^2$ $A^3$ $A^4$. The upper parts of said guides are bolted to the upright posts $F^3$. In Fig. 6 the block $F^2$ and the post $F^3$, to which the guide F, there shown in broken section, should be fastened, are removed. Said posts $F^3$ (four in all) are mortised into the longitudinal timbers of the thresher-frame at the points where it is desired to locate the driving-wheels, and they extend upward about four and one-half feet. The timber $F^4$ extends across the separator and is fastened to the tops of these posts $F^3$, so as to hold them firmly in position, as is best shown in Fig. 3.

A metal pipe G, about three feet long and about three inches inside diameter, is seated on the top of each axle-box E and extends upward. The upper ends of said pipes G are seated in the under side of other boxes H. One of said boxes H is shown in section in Fig. 9 and its lower half is shown in detail in Fig. 8. It is cast in two pieces and is intended to receive the cylindrical nut $H^2$. The upper and lower parts of said box H are bolted together by two short bolts $H^3$ and the two long bolts $H^4$, which pass through said box close on each side of said cylindrical nut $H^2$ and thence run down within the guide F and through the box E. The object of these long bolts $H^4$ is to hold the upper box H, the pipe G, and the axle-box E firmly together. The two top boxes H to each driving-wheel are connected by the two cross-shafts $H^5$, which pass across the top of said wheels and through holes $H^6$ is said boxes.

Two-inch steel screws J, about four and a half feet long, pass through castings $J^2$, which are fastened to the top of the cross-timber $F^4$, thence through said cross-timber, down by the side of the posts $F^3$, through flaring holes $H^7$ in the upper and lower parts of the boxes H, and engage threads similar to their own in the cylindrical nuts $H^2$, and then pass on down into the pipe G. A collar $J^3$ is shrunk on each of said screws a few inches below its upper end and fits in a depression in the lower surface of the plate $J^2$ above it. The screws are held firmly in position by said plates $J^2$ and collars $J^3$, but are permitted to turn freely. The purpose of having the holes $H^7$ in the boxes H made flaring is to allow for a slight side movement of said boxes without straining the screws. The purpose of the nuts $H^2$ being cylindrical is also to avoid strain from that slight side motion.

Two rods $J^4$ pass through holes in the sides of each of the castings $J^2$ and extend obliquely downward to the front and back of the posts $F^3$ and pass through the main longitudinal timbers of the thresher-frame. Their purpose is to brace the posts $F^3$ and add greater rigidity to the machine. They are provided with suitable nuts and washers, so that they may be tightened whenever necessary.

A bevel gear-wheel $J^5$ is keyed to the upper end of each of the screws $J$ that projects above the casting $J^2$. The said screws are turned by similar bevel gear-wheels $J^6$, adapted to mesh with the said gear-wheels $J^5$. There are four of these gear-wheels $J^6$, (one for each screw $J$,) fastened to a shaft $J^7$, which runs above and parallel with the cross-timber $F^4$ and which works in suitable bearings in a part of the castings $J^2$ that projects upward at right angles to the said cross-timber, as shown in Fig. 3. These gear-wheels $J^5$ and $J^6$ are so arranged that the two screws connected with one driving-wheel will be turned in the same direction and the two screws connected with the other wheel will move together in one direction; but their direction will be opposite to that of the screws of the first wheel. The result is that as one driving-wheel is raised the other is lowered.

The gear-wheel shaft $J^7$ is rotated by two sprocket-wheels $K$ $K^2$, which are loose on said shaft and which are shipped so that one or the other of them will engage a double clutch on said shaft between said sprocket-wheels $K$ and $K^2$. The shipper is of the usual form and is not shown in the accompanying drawings. When the harvester is working, these sprocket-wheels $K$ and $K^2$ are constantly being revolved in opposite directions to each other by the sprocket-chains $K^3$ and $K^4$. (Shown in Fig. 2.) The sprocket-chains $K^3$ and $K^4$ receive their power indirectly from one of the driving-wheels, as will be hereinafter explained.

It will be noticed that as one of the sprocket-wheels $K$ or $K^2$ engages the clutch the screws on one side of the harvester will unscrew in their cylindrical nuts $H^2$, and thus force the driving-wheel on that side down, and at the same time the screws on the other side are screwed down into their cylindrical nuts, and gravity acting upon the body of the harvester forces the wheel on that side up until the machine takes a position similar to that shown in Fig. 3. By clutching the other sprocket-wheel instead of the first used the driving-wheel now down will rise and the one up will be forced down. When the machine has taken the position desired, said wheels $K$ and $K^2$ are shipped to a position such that neither engages the clutch, and they simply revolve loosely upon the shaft $J^7$ without turning it.

Antifriction-rollers $L$ are placed on the ends of the cross-shafts $H^5$, as the same extend through and a little beyond the boxes $H$. Said rollers $L$ are provided with a flange $L^2$ on the side next said boxes $H$ and are constructed to bear against the upright posts $F^3$, their function being to guide and steady the boxes $H$ as they move up and down, as already described, and to lessen friction.

The cross-shafts $H^5$ above the right-hand driving-wheel $C$ extend to the right beyond said antifriction-rollers $L$ and a short distance past the post $F^3$. A cross-arm $H^8$ connects the ends of said shafts thus projecting and is fastened to them by set-screws $H^9$, so that it may be moved in near to the post $F^3$ or may be secured to their very ends. This cross-arm supports a rod $H^{10}$, which runs down and carries the inner end of the main timber of the header part of the harvester.

The header-frame consists principally of the main timber $N$, the rear brace $P$, the forward brace $P^2$, the timbers $Q$ $R$, and the five arms $S$, with braces $S^2$, that support the cutting apparatus and the grain-conveyer in front. It is supported on its right end by a small wheel $M$, and at its left end it is flexibly connected or hinged to the thresher by the rod $H^{10}$, that runs down from the cross-arm $H^8$ and fastens in an eyebolt $N^2$ on the left end of the main timber $N$ of the header. The two braces $P$ and $P^2$ from the header are also flexibly connected or hinged to the thresher, one forward and the other back of the main timber $N$. These three timbers $N$, $P$, and $P^2$ are attached to the thresher by hinges, as aforesaid, in order that the header may follow the surface of the ground while the thresher remains upright. The knuckle-joints $b$ and $c$, hereinafter described, are also for the same purpose. The header, as usual, has a sickle in front, a draper or conveyer, which is right back of the sickle and conveys the grain into the feeder-house, and a reel that bends the grain over the knife and causes it to fall upon the draper. The rod $H^{10}$ runs up from the eyebolt $N^2$ through a hole in the cross-bar $H^8$ and is screw-threaded at its upper end to receive nuts $H^{11}$, by means of which the height of the inner end of the header is adjusted and fixed. The rear brace $P$ is bolted to the main timber $N$ and fastened to the separator-frame by the pivotal hinge $P^3$. The forward brace $P^2$ is bolted to the brace $P$, to the timber $P^4$, projecting from the front thereof, and to the timber $N$ and is fastened to the thresher-frame by the rod $P^5$, which is pivotally connected with it and also pivotally connected with an upright that is carried by a diagonal timber $A^8$, bolted at both ends to the front part of said thresher-frame. The timber $P^4$, just referred to, is a cross-brace between the timber $N$ and the braces $P$ and $P^2$ on each side of it. The rear ends of the four inner supporting-bars $S$ are hinged by eyebolts to the main beam $N$ of the header-frame. The cutting apparatus is balanced by weighted levers T and T², that are connected to each other at their rear ends. The lever T, the forward end of which is connected with the right of the header-frame, has its fulcrum on the rear hinged brace P. The lever T², the forward end of which is attached to the left of the header-frame, is fulcrumed on the timber P⁴.

The power is transmitted from the driving-wheels as follows: Large sprocket-wheels C³ and D³ are fastened to the inner sides of the spokes of the driving-wheels C and D. The sprocket-wheel C³, fastened to the right driving-wheel C, is connected by a sprocket-chain with sprocket-wheel No. 1, which is situated back of C³ on shaft $a$. From said shaft $a$ the power is transmitted by various sprocket and cog wheel devices, so that this right-hand driving-wheel furnishes the force to operate the grain-carrier, the straw-carrier, the chaff-auger, the grain-auger, the chaff-elevator, the grain-elevator, the pickers, the chaff-carrier, the chaff-elevator, (which carries the chaff off onto the dump,) and the header machinery. A portion of the parts of the thresher above are run by power from sprocket-wheel No. 2, which is keyed to shaft $a$ on the left side of the thresher. Power is transmitted to the header machinery through a tumbling-rod $a^2$, that is fastened at one end by a knuckle-joint $b$ to the right end of shaft $a$ and at the other end by a knuckle-joint $c$ to rod $d$ on the header-frame. Rod $d$ has a sprocket-wheel No. 3 keyed to its right end, and from thence a sprocket-chain runs forward to a sprocket-wheel No. 4, which is keyed to a shaft U, journaled in the gearing-frame V. Shaft U is connected at its left end by bevel-gears W to another shaft Y, which runs the sickle and draper, and at its right end U carries the sprocket-wheel Z, which turns the reel.

The left driving-wheel has, as previously stated, a large sprocket-wheel D³ bolted to the inside of its spokes. This sprocket-wheel D³ is connected forward by a sprocket-chain D⁴ with sprocket-wheel No. 5. It may be connected back, as shown in Fig. 6, with a sprocket-wheel D⁵ and operate as well by providing operative connections between the wheel D⁵ and the parts driven from the wheel No. 5 in the other figures. Wheel No. 5 is keyed to and turns shaft $e$, which has a cog-wheel $f$ also keyed to it. Cog-wheel $f$ meshes with and drives a pinion $g$ on shaft $h$, located just in front of shaft $e$. Shaft $h$ has a cog-wheel $i$ on its right end which meshes with and drives a pinion $j$, situated just in front of it on the shaft $k$. Shaft $k$ extends to the right and left beyond the two main longitudinal timbers A A². On its right end is the belt-wheel $l$, used to drive the thresher's cylinder. On its left end is keyed a sprocket-wheel No. 6. A sprocket-chain transmits the power from wheel No. 6 backward and upward to sprocket-wheel No. 7, which is keyed to the beater-shaft $m$. There is also keyed to shaft $m$, a little to the left of No. 7, another sprocket-wheel No. 8. (Shown in Figs. 1 and 2.) From wheel No. 8 the sprocket-chain K³ leads to the right-hand sprocket-wheel K on the shaft J⁷, as already described. Another sprocket-wheel No. 9 is keyed to shaft $k$, just to the right of the left main longitudinal timber A and is connected by a sprocket-chain which runs under the separator with sprocket-wheel No. 10. Wheel No. 10 is fastened to a shaft $n$, which runs across the separator-house and transmits power to the second beater-shaft $p$. Shaft $p$ is provided with a sprocket-wheel No. 11, keyed to its left end, and from No. 11 the power is transmitted to the left-hand sprocket-wheel K² by the chain K⁴.

The left driving-wheel D furnishes power to run the feeder, the cylinder, the beaters, the cleaner, the separator-shoe, the separator-fan, and the mechanism for raising and lowering the driving-wheels.

Having now described my invention, what I claim, and desire to secure by Letters Patent of the United States, is—

1. In a sidehill-harvester, the combination with a main frame, of supporting-wheels, bearings for the wheels movable relative to the frame, screws connecting the main frame and the bearings for changing the vertical positions of the wheels relative to each other, and connecting mechanism for actuating said screws simultaneously.

2. In a sidehill-harvester, the combination with a main frame, of separate wheel-bearings, wheels in the wheel-bearings, adjusting-screws connecting the wheel-bearings with the main frame and mechanism connecting the screws for actuating the screws simultaneously to adjust the wheels relative to each other and to the main frame.

3. A thresher supported on wheels placed on opposite sides of it and having screws connected to the same combined with means to turn said screws together to move the said wheels simultaneously in opposite vertical directions whereby the thresher is maintained in a vertical position while working on a hillside substantially as set forth.

4. A thresher having two main supporting-wheels, a screw vertically arranged by the side of each of said wheels and connected therewith, and gearing acting to turn said screws oppositely one to another and cause them to move said wheels, one up and the other down, thereby maintaining the thresher vertical on uneven ground, substantially as set forth.

5. A thresher having guides fixed to it on opposite sides, bearing-wheels with axle-boxes fitting in said guides and vertically adjustable therein, and a screw mechanism operating to move said axle-boxes, one in one direction and the other oppositely within the guides, substantially as and for the purpose set forth.

6. A thresher having driving-wheels located on opposite sides of it, fixed vertical guides next to each wheel, boxes for the wheel-axles provided with rollers bearing on the rear side of said guides, suitably-supported screws connected with each axle-box, and connected mechanism operating to move the axle-boxes up and down oppositely to one another, substantially as and for the purposes set forth.

7. A thresher having bearing-wheels on opposite sides, boxes for the axles of said wheels, other boxes supported from said axle-boxes, each holding a nut, and screws working in said nuts, and connected mechanism for operating said screws to move said boxes in directions oppositely to each other, substantially as and for the purpose set forth.

8. A thresher having bearing-wheels on opposite sides, the axles of said wheels being journaled in a box at each end, pipes seated on each axle-box, other boxes secured to the upper ends of said pipes and also to the axle-boxes, cross-shafts connecting said other boxes with each other over each bearing-wheel, and oppositely-working screws having a screw-thread connection in said last-named boxes, substantially as and for the purpose set forth.

9. A thresher having bearing-wheels on opposite sides with suitable boxes at each end of the axles thereof, pipes rigidly secured to the top of each axle-box, other boxes firmly seated at the upper ends of said pipes, cross-shafts connecting said other boxes with each other over each bearing-wheel, oppositely-working screws having screw-thread connection in said last-named boxes, posts placed alongside of said screws and adapted to support the same and their actuating mechanism, and flanged rollers on said cross-shafts bearing on opposite posts, substantially as and for the purpose set forth.

10. A thresher having bearing-wheels on opposite sides, posts rigidly secured to the thresher-frame by the sides of each wheel, a cross-beam connecting the upper ends of said posts with one another, boxes in which the axles of said wheels are journaled at each end, other boxes located above the axle-boxes and bolted thereto, castings firmly seated on said cross-beam, screws having each a collar fitting in a depression in the under side of one of said castings and each having a screw-thread connection in one of the upper boxes, and means to work said screws in opposite directions for each bearing-wheel, substantially as and for the purpose set forth.

11. A thresher having bearing-wheels on opposite sides, posts rigidly secured to the thresher-frame by the sides of each wheel, a cross-beam connecting the upper ends of said posts with one another, oppositely-working screws extending downwardly from said beam and having connections with said bearing-wheels whereby the latter can be moved in opposite vertical directions, a rotary shaft connecting said screws with one another, gearing to rotate said shaft, and a clutch controlling the gearing so the shaft may be rotated in one direction or the other as needed, substantially as and for the purpose set forth.

12. A harvester comprising a thresher having separately-mounted side bearing-wheels, a screw mechanism connected with said wheels and operating to move the same one up and the other down, and a header mounted on a wheel at its outer end and secured at its inner end to the wheel-bearing by means of flexible or pivotal connections, substantially as described.

13. In a thresher, the combination of ground-wheels at opposite sides, screws connected with the bearings of the wheels for moving said wheels, and connected mechanism operated by said wheels acting to operate said screws to positively move said wheels one up and the other down, substantially as described.

14. In a traveling harvester and in combination with a threshing-machine frame thereof, bearing-wheels upon opposite sides of said frame having independent shafts and journal-boxes therefor, guides in which said journal-boxes are movable up or down with relation to the ground, vertical screw-shafts connecting with the wheel-boxes, mechanism by which the journal-boxes of one wheel are moved in the opposite direction to and in unison with those of the other wheel and mechanism for reversing said movement.

15. In a traveling harvester, a supporting-frame, upper and lower boxes, the upper boxes being supported by the lower boxes, supporting-wheels journaled in the lower boxes, screw devices for raising and lowering the boxes, and means for reversely turning the screw devices belonging to the respective boxes of the supporting-wheels.

Signed by me at Stockton, California, this 9th day of December, 1898.

GEORGE W. HAINES. [L. S.]

Witnesses:
W. W. MIDDLECOFF,
EDGAR W. BUTTERS.